Dec. 16, 1958 R. H. MALM 2,865,014
CYCLIC GAIN CONTROLS FOR SONAR DEVICES
Filed Dec. 14, 1953
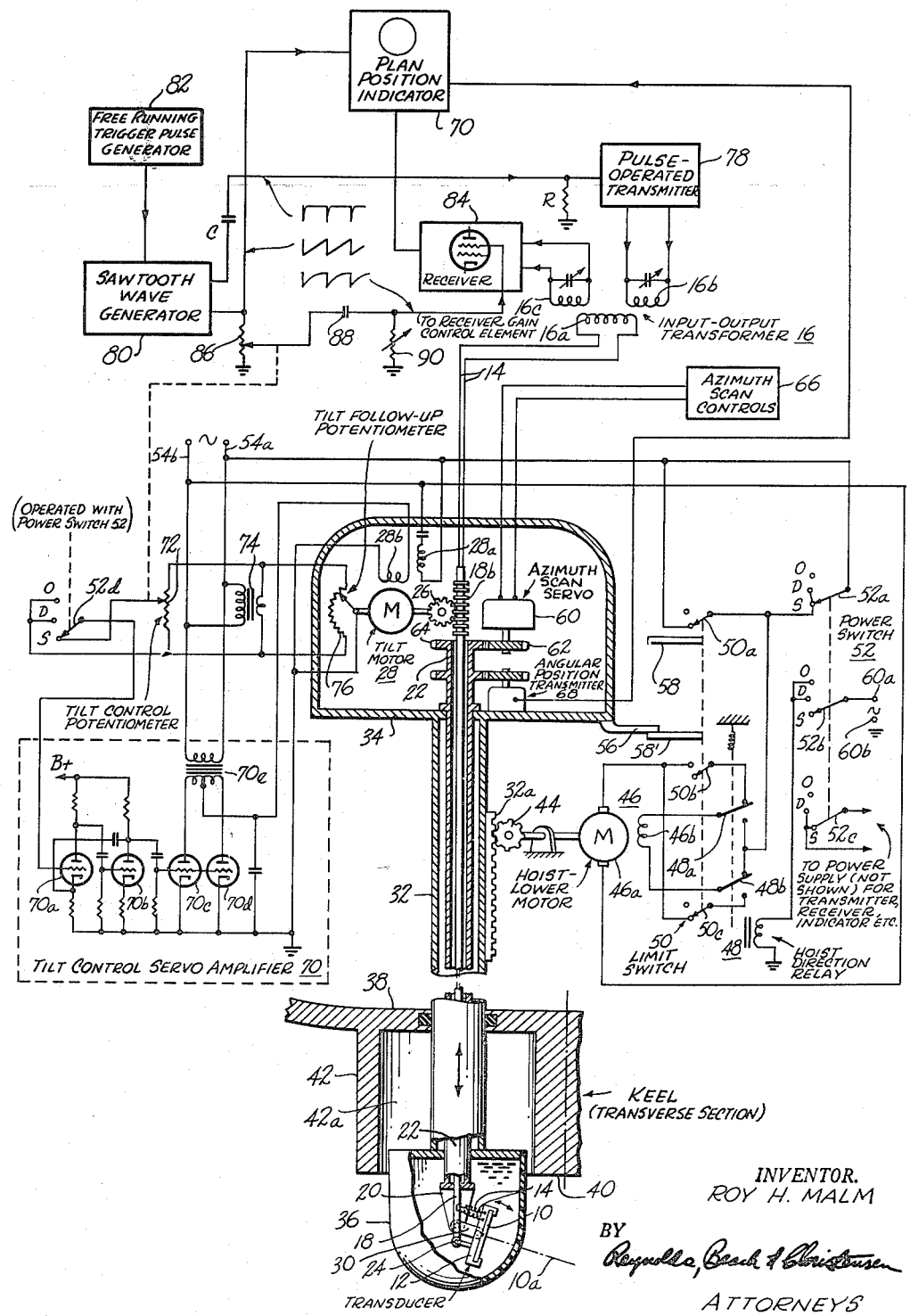
INVENTOR.
ROY H. MALM
BY
ATTORNEYS United States Patent Office 2,865,014
Patented Dec. 16, 1958

2,865,014

CYCLIC GAIN CONTROLS FOR SONAR DEVICES

Roy H. Malm, Seattle, Wash., assignor to Minneapolis-Honeywell Regulator Company, Minneapolis, Minn., a corporation of Delaware Application December 14, 1953, Serial No. 398,110

10 Claims. (Cl. 340—3)

This invention relates to pulse echo type propagative wave energy systems for detecting remote objects, and more particularly concerns improvements in underwater sonar, by which periodic pulses of compressional wave energy are transmitted in a directional beam and the ensuing energy reflections are detected at or near the transmitting station and presented on an indicator to reveal the presence and location of reflecting objects. The invention is herein illustratively described by reference to its presently preferred form; however, it should be understood that various changes and modifications herein may be made without departing from the essential features involved.

It is convenient in underwater sonar systems to employ a single electroacoustic transducer for both the transmitting and receiving functions. For most applications the transducer will be operated at very short wave lengths, so that the transducer may be relatively compact hence easily projected below a vessel for scanning purposes and possessed of a relatively narrow beam pattern providing good angular resolution for detecting angularly separated objects. The intermittently energized transducer is mounted so that it may be tilted directly downward for determining water's depth, horizontally for detecting floating objects and other obstructions, and at intermediate elevation angles for locating objects at various depths about the vessel.

In the operation of a system of the above description, having a cathode ray tube or like indicator, reverberation effects, which occur after each transmitted pulse and which have a progressive decaying characteristic, tend to pass through the receiver and to excite the cathode ray tube screen. Normally these disturbances persist over a substantial portion of each range sweep trace and unless suppressed have a tendency to mask any desired echo signals simultaneously applied to the indicator controls. This is partly due to saturability of the indicator fluorescent screen material or saturability of receiver stages. Moreover, even if all the useful echoes occur at greater ranges than the effective maximum duration of these disturbances, their very presence, creating relatively intense illumination on the indicator screen, makes it more difficult to discern faint signals representing detectable objects.

Cyclic gain control circuits which initially reduce and thereafter progressively increase receiver gain with each transmitted pulse can be of assistance in minimizing this difficulty. Another use of cyclic gain control circuits has been to compensate partly or wholly for the progressive attenuation of echo signals caused by the increasing wave propagation distances to objects which are increasingly remote. These two applications involve separate considerations, since the law governing attenuation of signals due to distance is not determined by the causes of reverberation and sporadic background disturbances.

The primary purpose of this invention is to provide a sonar device with means for the adequate suppression of reverberation effects by the cyclic gain control method and more particularly to accomplish this result without overly desensitizing the receiver during any portion of the reception interval. In the past optimum adjustment of cyclic gain control so as to achieve that result has been difficult, since the amount of initial gain reduction and the ensuing rate of gain recovery required during each transmission-reception interval to achieve optimum system performance were subject to variation depending upon operating conditions. There seemed to be no common denominator or basis from which to vary the cyclic gain control action automatically as needed so as to relieve the human operator of the necessity for making frequent readjustments thereof. The present invention provides a solution to this problem.

In achieving this object it was observed that when a sonar transducer is directed substantially horizontally, sea reverberation effects are likely to be greatest, since a maximum amount of disturbance energy will then be reflected from floating debris and from surface waves. If the water is relatively shallow this type of difficulty can be aggravated by the presence of any prominent side lobes in the transducer space-energy distribution pattern causing strong echoes directly from nearby bottom areas. However, it was also noted that by tilting the transducer downward at increasing angles, as when determining depth or when scanning in deeper water, the intensity of these reverberation effects and like disturbances diminished. Under a given set of operating conditions it was found that a substantially linear inverse relationship existed between transducer tilt angle and the maximum intensity and decay rate of these reverberations.

Based upon these and related observations, the present invention provides a cyclic gain control wave generating means operated synchronously with the sonar transducer and delivering a wave voltage which is varied in amplitude automatically as a function of transducer tilt angle. The gain-reducing cyclic gain control wave amplitude is a maximum with the transducer directed substantially horizontally, and is progressively reduced to a minimum as the transducer is tilted progressively downward to its greatest elevation angle, which is normally the vertical.

In terms of the preferred apparatus as herein disclosed, these results are accomplished by generating a basic cyclic gain control wave of predetermined constant amplitude and effective duration, and applying this wave to the winding of a potentiometer having a wiper electrically connected to a receiver gain control element. The potentiometer wiper is mechanically connected to or coordinated with the tilt mechanism, or with the tilt controls for the transducer in order to achieve the desired gain control wave variation mentioned.

These and other features, objects and advantages of the invention, including certain details of a sonar device to which the invention is illustratively applied will become more evident from the following description by reference to the accompanying drawing constituting a schematic diagram of the sonar device.

The description which follows deals first with the nature and working of a practicable transducer mechanism and the controls therefor incorporated in a sonar system.

Referring to the diagram, the transducer 10 comprises a disk of piezoelectric material suitably mounted in an insulating support 12 adapted for establishing the necessary electrical connections between the disk face electrodes and the conductors 14. The conductors 14 extend upwardly from the transducer through the hollow tilt control rod 18 and are connected at their upper ends to the terminals of the transformer winding 16a.

The transducer unit is carried between the sides of a yoke 20 mounted on the lower end of the rotatable vertical shaft 22. This shaft is hollow and receives the rod 18. The rod's projecting lower end is pivotally connected at 24 to the back side of the transducer mount. The rod's upper end projects beyond the top of the shaft 22 and carries a gear rack 18b having annular teeth engageable by the pinion 26. The formation of these rack teeth permits rotation of the rod without disengaging the rack and pinion. The pinion is rotated when required by the tilt motor 28. Between each of opposite sides of the transducer mount and the corresponding arm of the yoke 20 is a link 30 pivoted to each so as to permit tilting of the transducer in a vertical plane effected by pinion-driven vertical shifting of the tilt control rod 18. The two links 30, as a means of mounting the transducer on the yoke 20, permit the lower end of the control rod to move up and down in a straight line in order to effect tilting of the transducer between horizontally and vertically directed positions.

As will be seen from the drawing, the entire transducer mechanism is carried by a composite housing comprising the nonrotative hollow hoist shaft 32, the upper assembly dome 34 supported on the upper end of this shaft, and the lower transducer casing or "sound dome" 36 supported from the lower end thereof. The casing 36 is preferably formed symmetrically about the axis of the shaft; its lower portion is formed as a hemisphere merging with its cylindrical upper portion. The wall material comprising the casing is designed according to well known principles to possess effective "transparency" to compressional wave energy at the operating frequency of the transducer. Various rubberlike or plastic materials serve well for that purpose. Preferably this casing is filled with a suitable liquid, such as castor oil, which will protect the metal parts against corrosion while permitting transfer of compressional wave energy between the transducer face and the wall of the casing for propagation into and from the surrounding body of water in which the unit operates.

The hoist shaft 32 extends through an opening in the bottom of the vessel 38 preferably at a location adjacent the keel 40. A protective fairing 42 mounted against and along the keel provides a downwardly opening well 42a into which the housed transducer may be retracted protectively when the sonar is to be turned off or is to be operated solely for depth sounding purposes. However, when azimuth scanning with the transducer is required, the hoist shaft 32 is again lowered in order to project the transducer unit below the lowest portion of the vessel so that there will be no interference with propagation of the compressional wave energy through the desired search sector. Raising and lowering of the housed apparatus carried by shaft 32 is effected by means of a gear rack 32a formed on one side of the shaft and a cooperative pinion 44 driven by the hoist-lower motor 46.

It is desirable for protective purposes that the transducer and surrounding casing 36 be retracted into the well 42a automatically when the system is turned off or is switched over to operate as a depth finder. Suitable automatic controls associated with the hoist-lower motor 46 are provided to that end. As illustrated, the hoist-lower motor comprises a commutator-type alternating current motor having the armature 46a and the series field 46b. Opposite terminals of the field winding 46b are connected to each of the two arms 48a and 48b of the hoist direction relay 48. In the denergized condition of this relay, the relay arm 48a engages an upper contact which is connected to the intermediate arm 50b of a ganged limit switch 50, whereas the other relay arm 48b engages an upper contact which is connected both to the lower contact engageable by arm 48a and to the interconnected "D" (depth finding) and "S" (scanning) position contacts of arm 52a in the three-position main power switch 52. The latter two contacts in turn are connected to the upper arm 50a of the ganged limit switch 50. The power switch arm 52a is connected to alternating current supply terminal 54a as is the lower of two terminals engageable by the limit switch upper arm 50a. The ganged limit switch arms are mechanically actuated into their upper positions by hoisting of the transducer mechanism into the well 42a. When this position is reached the abutment 56 carried by the upper housing 34 engages and raises the interfering abutment 58, operating the limit switch. Reverse actuation of the limit switch is effected by engagement of abutment 56 with a second interfering abutment 58' when the transducer mechanism is lowered into projecting position.

One brush of the hoist-lower motor armature 46a is connected to the upper contact engageable by limit switch intermediate arm 50b and to the lower contact engageable by limit switch lower arm 50c. The opposite armature brush is connected to the alternating current supply terminal 54b opposite to therminal 54a. The arm 50c is connected to the lower relay contact engageable by hoist relay arm 48b. When the hoist direction relay coil is energized, as by shifting the main power switch 52 to the "O" (off) "D" (depth finding) positions, applying voltage from source terminal 60a to the relay coil through the power switch arm 52b, the relay switch arms 48a and 48b are actuated downwardly. If the transducer unit is already in hoisted position, the upper brush of motor armature 46a will receive no voltage, since the limit switch arm 50b will then connect this brush to the disengaged upper contact associated with hoist relay switch 48a. Also the limit switch arm 50c is then disengaged from its lower contact connected to this armature brush. Consequently, the transducer assembly will not be moved out of its hoisted position.

However, if the transducer assembly is in its projected or lowered position at the time the power switch 52 is switched from the "S" (scan) position to either the "D" or "O" positions, the hoist-lower motor 46 will be energized to raise the transducer housing into the well 42a. Thus if the power switch 52 is switched into the "D" position, energizing hoist relay 48, supply terminal 54a will be connected to the upper terminal of motor field winding 46b and the lower terminal of this winding will be connected through limit switch arm 50c to the upper brush of motor armature 46a, which in turn has its opposite brush always connected to the supply terminal 54b. Thus the motor 46 will rotate in the direction to raise the transducer unit into the well 42a. The same action takes place in the event the power switch is moved from the "S" position directly to the "O" position in order to turn off the system. In this event the power source terminal 54a is connected through limit switch arm 50a to the upper terminal of motor field winding 46b. In either event, when the transducer unit reaches elevated position and abutment 56 contacts abutment 58 to actuate the limit switch arms upwardly, the motor 46 is automatically deenergized. When the power switch is in the "D" position such deenergization takes place because of the disengagement of limit switch arm 50c from its lower contact, whereas when the power switch is in the "O" position such deenergization takes place because of the disengagement of limit switch arm 50a from its lower contact.

Assuming the transducer unit to be in its elevated or hoisted position with the power switch in either the "D" or "O" positions, movement of the power switch to the "S" position automatically results in energization of the hoist-lower motor to lower the transducer unit and thereby position it for scanning operation. When the power switch is thus moved to the "S" position, relay 48 is deenergized, whereupon the lower terminal of motor winding 46b is connected through relay switch arm 48b and power switch arm 52a to the source terminal 54a. The opposite or lower side of winding 46b is connected by relay switch arm 48a and the limit switch arm 50b to the upper brush of armature 46a so that the motor is energized in a sense to move the transducer unit downwardly. When the desired lower limit position of the transducer unit is reached, the abutment 56 contacts and moves a second limit switch abutment 58' to actuate the limit switch to its lower position, whereupon the motor armature is deenergized.

The power switch 52 includes a third switch arm 52c having the three positional contacts "O", "D" and "S". The contacts "D" and "S" are connected together, whereas the contact "O" is isolated. In the "D" or "S" positions of the power switch the switch arm 52c completes a circuit for the power supply by which the sonar transmitter, receiver, indicator, etc. are energized. In the "O" position of arm 52c all of these circuit components are deenergized, and the system is effectively taken out of operation. However, the source of voltage for energizing the terminals 54a and 54b is independent and provides voltage to operate the hoist-lower motor in order to elevate the transducer unit protectively within the well 42a.

A fourth switch arm 52d and associated contacts are also provided (left of diagram) to assure that the transducer will be tilted directly downward automatically when the switch 52 is changed from the scan (S) setting to the depth finding (D) position. This action is discussed subsequently at greater length.

Angular scan of the transducer in azimuth is effected by the azimuth scan servo 60 mounted inside upper housing 34 and drivingly connected to the transducer yoke shaft 22 through the gears 62 and 64. The azimuth scan servo is operated by suitable azimuth controls 66 situated outside the housing 34 but not shown or describer in detail herein. These azimuth scan controls are preferably of a type capable of producing either or both sector scan or continuous rotational scan of the transducer in azimuth.

For indicating purposes the instantaneous rotated position of the transducer in azimuth is detected by the angular position transmitter 68 and this information is transmitted to the indicator apparatus 70 in suitable manner to coordinate the indication with actual direction of the transducer. The position transmitter 68 may comprise a Selsyn, a sine-cosine wound potentiometer or equivalent apparatus by which shaft rotational position may be converted into electrical signals suited for operating the deflection apparatus of a cathode ray tube or other indicator.

Tilt or elevation angle of the transducer axis 10a may be varied as previously mentioned by the tilt motor 28 mounted in upper housing unit 34 acting through the pinion 26 and rack 18b to raise and lower the tilt control rod 18. The tilt motor is illustrated to be of the split-phase alternating current induction type having the reference winding 28a continuously energized with voltage of constant amplitude by its connection to the alternating current source terminals 54a and 54b. This motor also has a control winding 28b so arranged in relation to the winding 28a that the phase and amplitude of current in the control winding determines the direction and amount of torque produced by the motor. For instance, if the flow of current in winding 28b leads the current in winding 28a by 90 electrical degrees the motor will rotate in one direction, whereas if it lags the other current by 90 degrees the motor will rotate in the opposite direction. The tilt control servo amplifier 70 controlled by the setting of tilt control potentiometer 72 determines energization of control winding 28b.

The amplifier 70 comprises the first and second amplifier stages 70a, 70b and the two output stages 70c and 70d. The anodes of the two output amplifier tubes are connected to the respective terminals of the secondary winding of power transformer 70e. The primary of this transformer is continuously energized by connection to the source terminals 54a and 54b as shown. The midtap of the secondary winding of transformer 70e is connected to one end of tilt motor control winding 28b, whereas the opposite end of this winding is connected to ground. The wiper of the manually adjustable tilt control potentiometer 72 is connected to the control grid of the first stage 70a, whereas the winding of this potentiometer is energized by the secondary of the transformer 74 having its primary connected across the source terminals 54a and 54b. The winding of the tilt follow-up potentiometer 76 is also connected across the secondary of transformer 74, whereas the wiper of the latter potentiometer is grounded. This wiper is mechanically positioned in accordance with the tilt angle of the transducer 10 as indicated schematically in the diagram.

If the wiper of tilt follow-up potentiometer 76 is in a position which corresponds electrically to the wiper position of the tilt control potentiometer 72, then the voltage applied between ground and the control grid of the first stage 70a will be zero, since the bridge circuit comprising the two potentiometers will be balanced. Under these conditions equal but opposite currents will flow in the control winding 28b of the tilt motor on alternate half cycles of alternating current and no motor torque will develop. However, if the position of the wiper of the tilt follow-up potentiometer 76 does not correspond with that of tilt control potentiometer 72, alternating voltage will be applied to the input of the first stage 70a, the phasing of which will be determined by the direction of the positional error of the tilt follow-up potentiometer wiper. The amplitude of this error voltage will correspond to the degree of positional error. Thus, during one-half cycle of the alternating voltage applied to transformer 70e, the effective anode voltage of one of tubes 70c and 70d will be positive going while its grid voltage is also positive going, producing a flow of anode current in that tube and in the tilt motor control winding 28b. The direction of the resulting half sine wave pulse of current flowing in the control winding will depend upon which of the tubes 70c or 70d becomes conductive which in turn depends upon the sense of the tilt positional error controlling phase of the error voltage. Thus merely by moving the tilt control potentiometer wiper to different positions along its winding, the tilt of transducer 10 may be varied correspondingly. Preferably the circuit constants are so selected that the range of tilt of the transducer effected by potentiometer 72 is 90 degrees including the horizontal and vertical positions of the transducer axis 10a.

The power switch arm 52d is arranged to disconnect the control grid of amplifier 70a from the wiper of potentiometer 72 and to connect this grid directly to one side of the winding of the potentiometer when the switch 52 is moved from the "S" (scan) to the "D" (depth finding) or "O" (off) positions. For this purpose the "S" contact of switch arm 52d is connected to the wiper of potentiometer 72, whereas the "D," and preferably also the "O," contact is connected to one side of its winding, or at least to a point of potential which will cause the servo amplifier 70 to direct the transducer 10 downward automatically whenever the system is switched over to depth finding operation. This arrangement relieves the operator of the task of manipulating separate controls properly conditioning the tilt circuits for the different modes of operation.

The system transmitter 78 is of the pulse-operated type. Triggering of the transmitter takes place periodically at a repetition rate selected in accordance with the desired maximum range of the sonar. Such triggering is effected by applying the sawtooth wave voltage produced by sawtooth wave generator 80 to a differentiating circuit comprising the condenser C and the resistor R, wherein the abrupt transitions of sawtooth wave voltage are converted into very short trigger pulses capable of initiating the transmitter output pulse. The sawtooth wave generator 80 may be of any conventional type, such as a triggered relaxation oscillator or the like, and itself is triggered at the desired repetition rate by the freerunning trigger pulse generator 82. The transmitter output pulse may be of any desired duration and normally is selected in accordance with the desired range resolution of the sonar system, i. e. its ability to discern distinct objects lying in the transmitted energy beam at slightly different distances from the transducer. This output pulse energy, ordinarily occurring at ultrasonic frequencies, is applied to the tuned primary winding 16d of the input-output transformer 16. Due to mutual coupling, such energy is transferred through the secondary winding 16a to the transducer 10 and produces a pulse of compressional wave energy along the beam axis 10a.

In the receiving interval which follows each transmitted pulse, energy reflections incident on the transducer 10 produce electrical signals therein which are transferred by the winding 16a to the tuned secondary winding 16c connected to the input terminals of the system receiver 84. These signals, representing desired echoes and reverberation effects, are amplified and applied to the indicator 70. Preferably this indicator is of the plan position type embodying a cathode ray tube. According to well known principles of operation in such indicators each cycle of the sawtooth wave voltage produced by generator 80 is applied to the electron beam deflection apparatus of the cathode ray tube and produces a radial sweep across the face of the tube commencing from the center of the screen and progressing linearly to the outer edge thereof. The direction of this sweep is varied in accordance with the changing azimuth angle of the transducer and is under control of the angular position transmitter 68. The radially swept electron beam in the indicator tube is intensity-modulated by received echoes, and a map-like display of reflecting objects in the area of scan is thereby presented. Hence the radial position on the indicator screen of the echo signal images produced by intensification of the electron beam and the angular position of these images represent, respectively, the range and azimuth of the reflecting objects.

In case the transducer is directed vertically downward for depth finding purposes a circle is traced on the indicator screen at a radius constituting a measure of depth. If the angular scan movement is interrupted under those conditions only one point on the circle is illuminated. Under either of these operating conditions the cathode ray tube screen is likely to be relatively uncluttered by other disturbances, i. e. appearing at lesser radii on the screen, since, except for the presence of fish or other objects detection of which is often useful, the body of water through which most of the energy propagates in reaching the ocean bottom and returning to the transducer is substantially homogeneous and undisturbed.

However, if the transducer is tilted upward to direct its beam axis 10a horizontally, it is often found that reverberation effects are so great and persistent over at least an early fraction of the total reception interval, as to saturate receiver stages or the indicator fluorescent screen material, thereby masking useful echoes. This effect is the result of energy reflection from waves, seaweed and other floating debris in the vicinity of the vessel. When operating in shallow water, somewhat the same effect is manifested due to bottom reflections of energy in any prominent side lobes of the transducer space-energy distribution pattern. When operating in deeper water and with the transducer tilt angle increased these various reverberation effects are less intense.

In accordance with the present invention cyclic gain control voltage applied to the receiver is varied in amplitude automatically as a function of varying tilt of the transducer. In the drawing it will be noted that the wiper of the tilt control potentiometer 72 is mechanically connected to the wiper of the potentiometer 86, the winding of the latter being impressed with the sawtooth wave produced by generator 80. The mechanical connection between these two wipers is such that the sawtooth wave amplitude derived from potentiometer 86 is a maximum when the tilt control potentiometer is adjusted to a position in which the transducer 10 has minimum downward tilt from the horizontal. Normally this position would correspond to the true horizontal of the transducer axis 10a. The wiper of potentiometer 86 is connected through a condenser 88 to a receiver gain control element such as one or more control grids of receiver amplifier stages. A variable resistance 90 is shunted across the input to the receiver gain control element and together with condenser 88 forms a differentiating circuit interposed between the potentiometer 86 and the receiver gain control element. The setting of variable resistor 90 determines the time constant of the differentiating circuit and hence the amount of distortion of the sawtooth wave actually reaching the receiver gain control element. The wave forms are illustrated in the figure adjacent the conductors in which they exist. By decreasing the resistance 90 from a very large value to progressively smaller values, the distorted sawtooth wave reaching the receiver gain control element is converted from its original sawtooth form to an exponential of progressively increasing decay rate.

It will be apparent from the foregoing that the amplitude of the sawtooth wave applied to the differentiating network 88, 90, hence to the receiver gain control element, is varied by potentiometer 86 directly as a function of transducer tilt angle. When the reverberation effects are greatest, the amount of receiver gain reduction taking place at the initiation of each transmitted pulse is a maximum. Preferably the cyclic gain control wave is reduced substantially to zero when the transducer is directed vertically downward. Also the rate of decay of the distorted sawtooth wave is then a maximum. If the decay rate of this gain control wave is excessive, so that reverberation effects persist longer than the control wave it is merely necessary to increase the setting of variable resistor 90 so as to increase the time constant of the differentiating circuit. However, it is found that the occasions for readjusting the variable resistor 90 are relatively infrequent and that under a particular set of operating conditions the only variation of gain control voltage required to provide optimum gain reduction and recovery rate for suppressing reverberations is the variation automatically produced by potentiometer 86 when transducer tilt is varied. Normally, therefore, effective duration of the cyclic gain control wave applied to the receiver will remain substantially constant throughout automatically effected variations of amplitude thereof.

It will be understood that the use of this novel cyclic gain control arrangement having as its primary purpose the suppression of sea reverberation effects and the like does not necessarily preclude use in the same sonar device of other receiver gain control or blanking apparatus for other purposes. In some instances it may be desirable for certain purposes to employ other gain control means, cyclically operating or otherwise, having an effect which is superimposed upon that utilized for the present purpose. As an example, it may be desirable under certain circumstances to progressively increase the receiver gain throughout the entire reception interval in order to compensate for the progressive decay of echo strength as a function of the distance to the reflecting objects producing the echoes. Upon that type of control the present automatically varied cyclic gain control action may be superimposed in order to suppress reverberation and like effects.

It will also be appreciated that other means may be utilized for causing the amplitude of the cyclic gain control wave to be varied as a function of transducer tilt. The potentiometer 86 mechanically linked with the tilt control potentiometer is the preferred form and is considered as the simplest arrangement, in that it places the related controls in portions of the apparatus permitting them to be mounted in the same chassis. As a less convenient alternative, this potentiometer could be connected mechanically to an element in the transducer tilt mechanism, such as pinion 26, in which event the potentiometer or a mechanical connection would be located physically in the upper housing unit 34.

These and other variations will be apparent to those skilled in the art.

I claim as my invention:

1. An underwater sonar device comprising an electroacoustic transducer having a directional beam pattern, means supporting said transducer for variable tilting of the beam axis thereof throughout a substantial range of elevation angles, an indicator, receiving means operating said indicator and connected for energization by said transducer, means operatively associated with said transducer for transmitting compressional wave energy pulses at intervals into the region toward which said transducer is directed, and thereby producing energy reflections from remote objects detectable by said transducer for energizing said receiving means, cyclic gain control means acting on said receiver, said gain control means being operated synchronously with said transmitting means for initially reducing and thereafter progressively increasing the gain of said receiving means with each transmitted pulse, and tilt-operated means operatively connected to said cyclic gain control means and actuated automatically with variations in the tilt of said transducer for increasing and decreasing the initial gain reduction of said receiving means with decrease and increase, respectively, of the downward tilt angle of said transducer.

2. The underwater sonar device defined in claim 1, wherein the transducer is supported for tilting throughout a range of elevation angles extending from substantially the horizontal to substantially the vertical, and the tilt-operated means progressively reduces the effectiveness of the cyclic gain control means from a maximum value with the transducer directed substantially horizontally to a minimum value with the transducer directed substantially vertically downward.

3. The underwater sonar device defined in claim 2, wherein the cyclic gain control circuit comprises a wave generating circuit producing a cyclic gain control wave of predetermined amplitude and effective duration, and the tilt-controlled means comprises potentiometer means having a winding impressed with said wave and a variable pickup element connected electrically to the receiver, and means mechanically connected to said potentiometer effecting relative movement between said pickup element and said winding automatically with tilting of the transducer.

4. The underwater sonar device defined in claim 3, and wave shaping means operatively associated with the cyclic gain control means for varying the effective gain recovery rate without materially varying the initial gain reduction, said wave shaping means being manually adjustable independently of the tilt-controlled means.

5. The underwater sonar device defined in claim 1, wherein the cyclic gain control means comprises a wave generating circuit producing a cyclic gain control wave of predetermined amplitude and effective duration, and wherein the tilt-operated means comprises means for varying the wave amplitude applied to the receiver without materially varying the effective wave duration.

6. An underwater sonar device comprising an electroacoustic transducer having a directional beam pattern, means supporting said transducer for variable tilting of the beam axis throughout a substantial range of elevation angles, an indicator, receiving means operating said indicator and connected for energization by said transducer, means operatively associated with said transducer for transmitting compressional wave energy pulses at intervals into the region toward which said transducer is directed, and thereby producing energy reflections from remote objects detectable by said transducer for energizing said receiving means, said receiving means including a gain control element, circuit means generating a gain-reducing sawtooth wave for application to said gain control element to initially reduce and thereafter progressively increase the gain of said receiving means with each transmitted pulse so as to tend to suppress reverberation and like effects in said receiving means occurring with a decaying characteristic following each transmitted pulse, and tilt-operated means operatively connected to said circuit means and actuated automatically with variations in the tilt of said transducer for increasing and decreasing the initial gain reduction of said receiving means with decrease and increase, respectively, of the downward tilt angle of said transducer.

7. An underwater sonar device comprising an electroacoustic transducer having a directional beam pattern, means supporting said transducer for variable tilting of the beam axis throughout a substantial range of elevation angles, an indicator, receiving means operating said indicator and connected for energization by said transducer, means for transmitting compressional wave energy pulses at intervals into the region toward which said transducer is directed, and thereby producing energy reflections from remote objects detectable by said transducer for energizing said receiving means, said receiving means including a gain control element, circuit means generating a gain-reducing sawtooth wave for application to said gain control element to initially reduce and thereafter progressively increase the gain of said receiving means with each transmitted pulse so as to tend to suppress reverberation and like effects in said receiving means occurring with a decaying characteristic following each transmitted pulse, and network means applying said sawtooth wave to said gain control element including sawtooth wave attenuating means mechanically adjusted with tilting of said transducer for increasing and decreasing the amplitude of the saw tooth wave applied to said gain control element with decrease and increase, respectively, of the downward tilt angle of said transducer.

8. The underwater sonar device defined in claim 7, wherein the network means additionally comprises a differentiating circuit having a variable resistance therein converting the sawtooth wave into an exponential wave with a time constant determined by the setting of said variable resistance, for application to said gain control element.

9. In a pulse-operated compressional wave energy system adapted for detection of remote objects underwater, an electroacoustic transducer having a directional beam pattern, an indicator of the cathode ray tube type energized by signals from said transducer representing energy reflections from remote objects, means for transmitting compressional wave energy pulses at intervals into the region toward which said transducer is directed and thereby producing energy reflections from remote objects detectable by said transducer for energizing said indicator, means operable to vary the elevation angle of the transducer beam axis throughout a substantial range extending substantially from the horizontal to substantially the vertical, and means connected to said indicator to vary the amplitude of transducer signals reaching said indicator, said latter means including variable signal reducing means operated synchronously with said transmitter means for initially reducing and thereafter progressively increasing the effectiveness of said signals to operate said indicator, said last-mentioned means including a control element mechanically adjusted automatically with variations in tilt of said transducer beam axis for increasing and decreasing the effectiveness of said last-mentioned means with decrease and increase respectively of the downward tilt angle of said transducer.

10. An underwater sonar device comprising an electroacoustic transducer having a directional beam pattern, means for variably tilting said transducer throughout a substantial range of elevation angles of the beam axis thereof, an indicator, a receiver operating said indicator and connected for energization by said transducer, means for transmitting compressional wave energy into the region toward which said transducer is directed in the various tilted positions of said transducer, and receiver gain control means operable to suppress reverberation and like effects in said receiver and controlled by tilting of said transducer to vary the degree of gain effected by said gain control means automatically upwardly and downwardly with increase and decrease, respectively, of the downward tilt angle of said transducer beam axis.

References Cited in the file of this patent

UNITED STATES PATENTS

| | | |
|---|---|---|
| 2,426,657 | Williams | Sept. 2, 1947 |
| 2,456,952 | Kluender | Dec. 21, 1948 |
| 2,583,531 | Hathaway | Jan. 29, 1952 |